US011868134B2

(12) United States Patent
Yan

(10) Patent No.: US 11,868,134 B2
(45) Date of Patent: Jan. 9, 2024

(54) OBSTACLE NAVIGATION TRAVELLING DEVICE OF POWER LINE INSPECTION ROBOT

(71) Applicant: JIANGNAN UNIVERSITY, Wuxi (CN)

(72) Inventor: Wenxu Yan, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 839 days.

(21) Appl. No.: 16/964,560

(22) PCT Filed: Mar. 18, 2019

(86) PCT No.: PCT/CN2019/078446
§ 371 (c)(1),
(2) Date: Jul. 23, 2020

(87) PCT Pub. No.: WO2020/181566
PCT Pub. Date: Sep. 17, 2020

(65) Prior Publication Data
US 2021/0365028 A1      Nov. 25, 2021

(30) Foreign Application Priority Data

Mar. 8, 2019   (CN) .......................... 201910176236.3

(51) Int. Cl.
*G05D 1/02*      (2020.01)
*B61B 3/02*      (2006.01)
*H02G 1/02*      (2006.01)

(52) U.S. Cl.
CPC ............. *G05D 1/0214* (2013.01); *B61B 3/02* (2013.01); *H02G 1/02* (2013.01)

(58) Field of Classification Search
CPC ........... G05D 1/0214; B61B 3/02; H02G 1/02
See application file for complete search history.

(56) References Cited

U.S. PATENT DOCUMENTS

2014/0208976 A1    7/2014 Jung et al.

FOREIGN PATENT DOCUMENTS

| CN | 205212338 U | | 5/2016 |
| CN | 105870832 A | | 8/2016 |
| CN | 106711837 A | * | 5/2017 |
| CN | 106711837 A | | 5/2017 |
| CN | 109193452 A | | 1/2019 |
| JP | H102114807 A | | 4/1990 |

* cited by examiner

*Primary Examiner* — Scott A Browne

(57) ABSTRACT

The present invention discloses an obstacle navigation travelling device of a power line inspection robot. The present obstacle navigation travelling device of a power line inspection robot includes: a travelling device underframe; a first arm assembly mounted at one end of the travelling device underframe; a first linear driving device for driving the first arm assembly to move linearly on the one end of the travelling device underframe; a second arm assembly mounted at one end of the travelling device underframe far from the first arm assembly; a second linear driving device for driving the second arm assembly to move linearly on the one end of the travelling device underframe far from the first arm assembly; and a third arm assembly. The present invention has the beneficial effects of a large turning range and excellent balancing.

9 Claims, 4 Drawing Sheets

OBSTACLE NAVIGATION TRAVELLING DEVICE OF POWER LINE INSPECTION ROBOT

This application is the National Stage Application of PCT/CN2019/078446, filed on Mar. 18, 2019, which claims priority to Chinese Patent Application No.: 201910176236.3, Mar. 8, 2019, which is incorporated by reference for all purposes as if fully set forth herein.

FIELD OF THE INVENTION

The present invention relates to the field of power line inspection, and more particularly, to an obstacle navigation travelling device of a power line inspection robot.

DESCRIPTION OF THE RELATED ART

In order to ensure the secure and stable operation of high-voltage power lines, it is necessary to maintain the high-voltage power lines regularly. Inspection of the high-voltage power line is essential for ensuring safety of a power grid. As high-voltage power lines are widely distributed, possibly in a region with complicated geographical environments, where manual inspection is not applicable due to high labor intensity and low inspection accuracy. Therefore, a new inspection approach has to be found.

Conventional techniques have the following technical problems.

Many obstacle navigation travelling devices of a power line inspection robot capable of linear obstacle navigation have been developed in conventional techniques. The robot in CN106786170A, titled POWER LINE INSPECTION ROBOT, is capable of obstacle navigation while turning. However, the power line inspection robot in CN106786170A has a vertical motion mechanism that is arranged on a rotating mechanism, which causes great inertia and instability of the rotation mechanism during rotation, and results in a limited turning range of the overall device. Moreover, the weight center in the linear obstacle navigation of the inspection robot does not lies in the geometric center of the overall robot, which causes instability, so that the robot may easily be disengaged from the power line. Therefore, it is necessary to add a counterweight balancing device, such as the one in the robot from CN103904583A, titled SWING-ARM MOBILE INSPECTION ROBOT FOR RAILWAY TRACTION POWER LINES. However, adding a counterweight balancing device increases the weight and cost of an obstacle navigation travelling device of a power line inspection robot.

SUMMARY OF THE INVENTION

The technical problem to be solved by the present invention is to provide an obstacle navigation travelling device of a power line inspection robot, and the device has a large turning range and excellent balancing.

In order to solve the technical problem mentioned above, the present invention provides an obstacle navigation travelling device of a power line inspection robot, including:
  a travelling device underframe;
  a first arm assembly mounted on one end of the travelling device underframe;
  a first linear driving device for driving the first arm assembly to move linearly on the one end of the travelling device underframe;
  a second arm assembly mounted on one end of the travelling device underframe far from the first arm assembly;
  a second linear driving device for driving the second arm assembly to move linearly on the one end of the travelling device underframe far from the first arm assembly;
  a third arm assembly mounted on the travelling device underframe and positioned between the first arm assembly and the second arm assembly;
  a third driving device for driving the third arm assembly to move two-dimensionally and linearly on the travelling device underframe; and
  a sensor for detecting whether the obstacle navigation travelling device of the power line inspection robot encounters an obstacle during travelling;
  wherein the first arm assembly, second arm assembly, and third arm assembly each includes an elevating device at the bottom, a rotating device driven by the elevating device, and an arm driven by the rotating device, the rotating device is located in a plane during rotation that is parallel to an upper end face of the travelling device underframe.

The present invention has the beneficial effects of a large turning range and excellent balancing.

In an embodiment, the first linear driving device and the second linear driving device each includes a device base, two screw seats, a motion motor, a motion screw, a motion guiderail, and a motion platform. The screw seats are positioned on two ends of the device base respectively. The two ends of the motion screw are arranged respectively inside the screw seats. The motion motor is secured to the device base for driving the motion screw, and the motion platform is driven by the motion screw to slide on the motion guiderail.

In an embodiment, the elevating device includes an elevating device support frame, an elevation motor, an elevation driving gear, an elevation driven gear, an elevation screw, and an elevation guiderail. The elevating device support frame is sleeved on the elevation guiderail. The elevation motor is secured to the elevating device support frame, the driving gear is driven by the elevation motor, the driving gear is engaged with the driven gear, and the driven gear is sleeved on the elevation screw and in threaded connection with the elevation screw. The elevation guiderail includes four cylindrical support bars.

In an embodiment, the rotating device includes a rotation motor, a rotation driving gear, a rotation driven gear, and a rotating device support frame. The rotation motor drives the driving gear, and the rotation driving gear is engaged with the rotation driven gear, and the driven gear is rotated on the rotating device support frame.

In an embodiment, the arm includes:
  an arm body;
  a travelling wheel assembly arranged on one end of the arm body, and including a travelling wheel and a travelling wheel motor for driving the travelling wheel; and
  a clamped wheel assembly arranged on one end of the arm body proximate to the travelling wheel assembly, and including two clamped wheels and a clamped wheel motor for driving the two clamped wheels; the two clamped wheels being positioned respectively on two sides of the travelling wheel; the two clamped wheels and the travelling wheel being positioned respectively on two sides of the power line when the two clamped wheels and the travelling wheel are in contact with the power line.

In an embodiment, the clamped wheels are each driven by a clamped wheel motor.

In an embodiment, the two clamped wheels are symmetric with respect to the travelling wheel.

In an embodiment, the diameter of the travelling wheel is greater than that of the clamped wheels.

In an embodiment, the sensor is arranged on at least one side of the travelling wheel.

In an embodiment, the sensor is a photosensor or a touch sensor.

DETAILED DESCRIPTION OF THE PREFERRED EMBODIMENTS

The present invention will be further described below with reference to the drawings and specific embodiments, so that those skilled in the art can better understand and implement the present invention, but the illustrated embodiments are not intended to limit the present invention.

Figure 1:
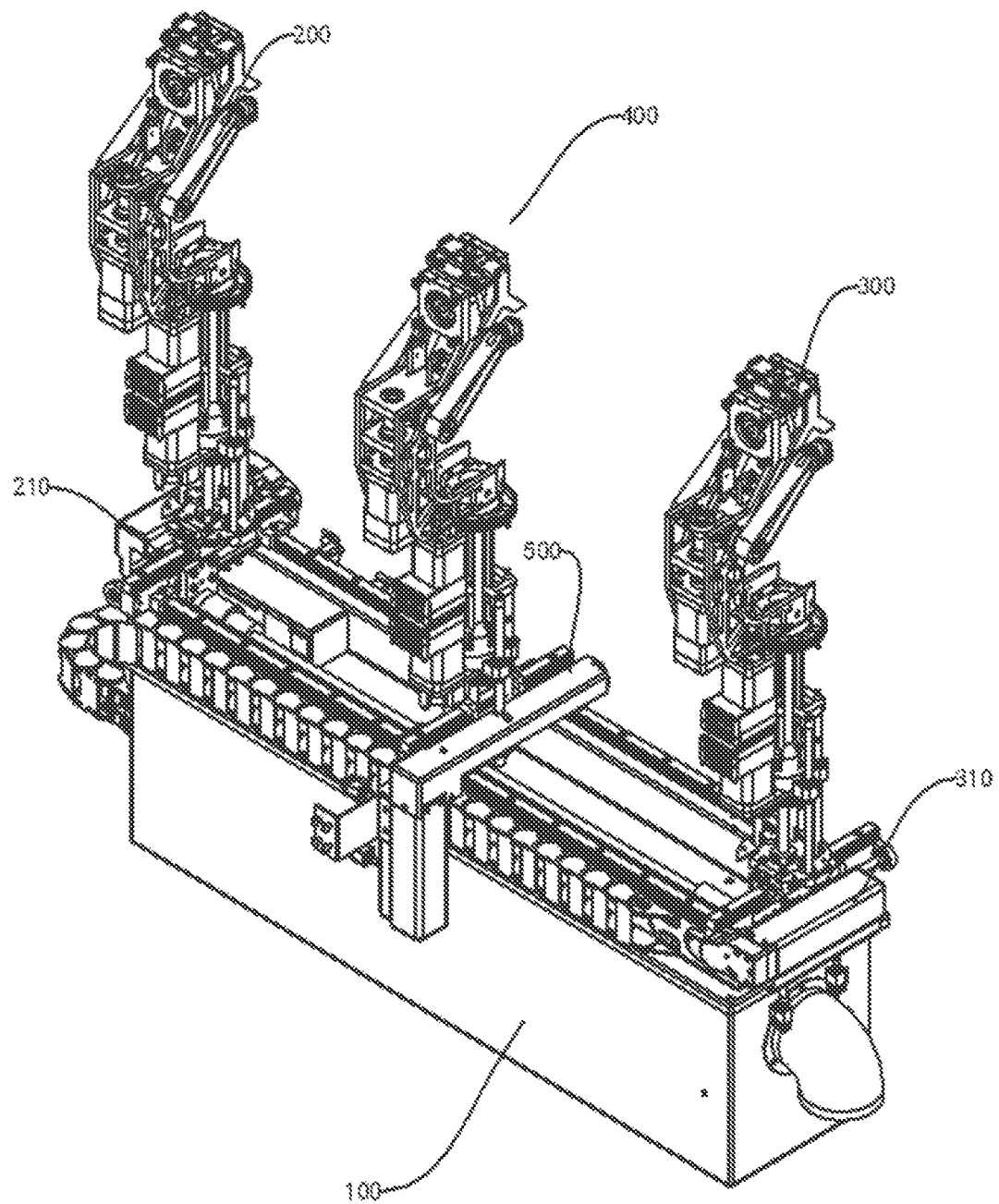
FIG. 1 is a schematic view of an obstacle navigation travelling device of a power line inspection robot according to the present invention.

With reference to FIG. 1, an obstacle navigation travelling device of a power line inspection robot includes:

a travelling device underframe 100;
a first arm assembly 200 mounted on one end of the travelling device underframe;
a first linear driving device 210 for driving the first arm assembly to move linearly on one end of the travelling device underframe;
a second arm assembly 300 mounted on one end of the travelling device underframe far from the first arm assembly;
a second linear driving device 310 for driving the second arm assembly to move linearly on one end of the travelling device underframe far from the first arm assembly;
a third arm assembly 400 mounted on the travelling device underframe and positioned between the first arm assembly and the second arm assembly;
a third driving device 500 for driving the third arm assembly to move linearly and two-dimensionally on the travelling device underframe; and
a sensor for detecting whether the obstacle navigation travelling device of the power line inspection robot encounters an obstacle during travelling (not shown).

The first arm assembly, second arm assembly, and third arm assembly each includes an elevating device 610 at the bottom, a rotating device 620 driven in elevation by the elevating device, and an arm 900 driven in rotation by the rotating device, the rotating device is located in a plane during rotation that is parallel to an upper end face of the travelling device underframe.

The present invention has the beneficial effects of a large turning range and excellent balancing. Specifically, for the three arm assemblies, as the rotating device is arranged above the elevating device, the rotating device has little inertia and thus is stable during rotation. Meanwhile, the three arm assemblies are all capable of linear motion on the travelling device underframe. Therefore, the turning range is increased (it is capable of obstacle navigation while turning and has both a Y-axis and an R-axis, as opposed to the power line inspection robot from CN106786170A which only has an R-axis). The weight center of linear obstacle navigation according to the present application is positioned at the geometric center of the overall robot, making the robot stable and unlikely to be disengaged from the power line. During turning or obstacle navigation while turning, the third driving device acts to change the center of the overall device and serves as the counterweight, since it is capable of two-dimensional linear motion on the travelling device underframe, thereby eliminating the need for an additional counterweight balancing device.

Figure 2:
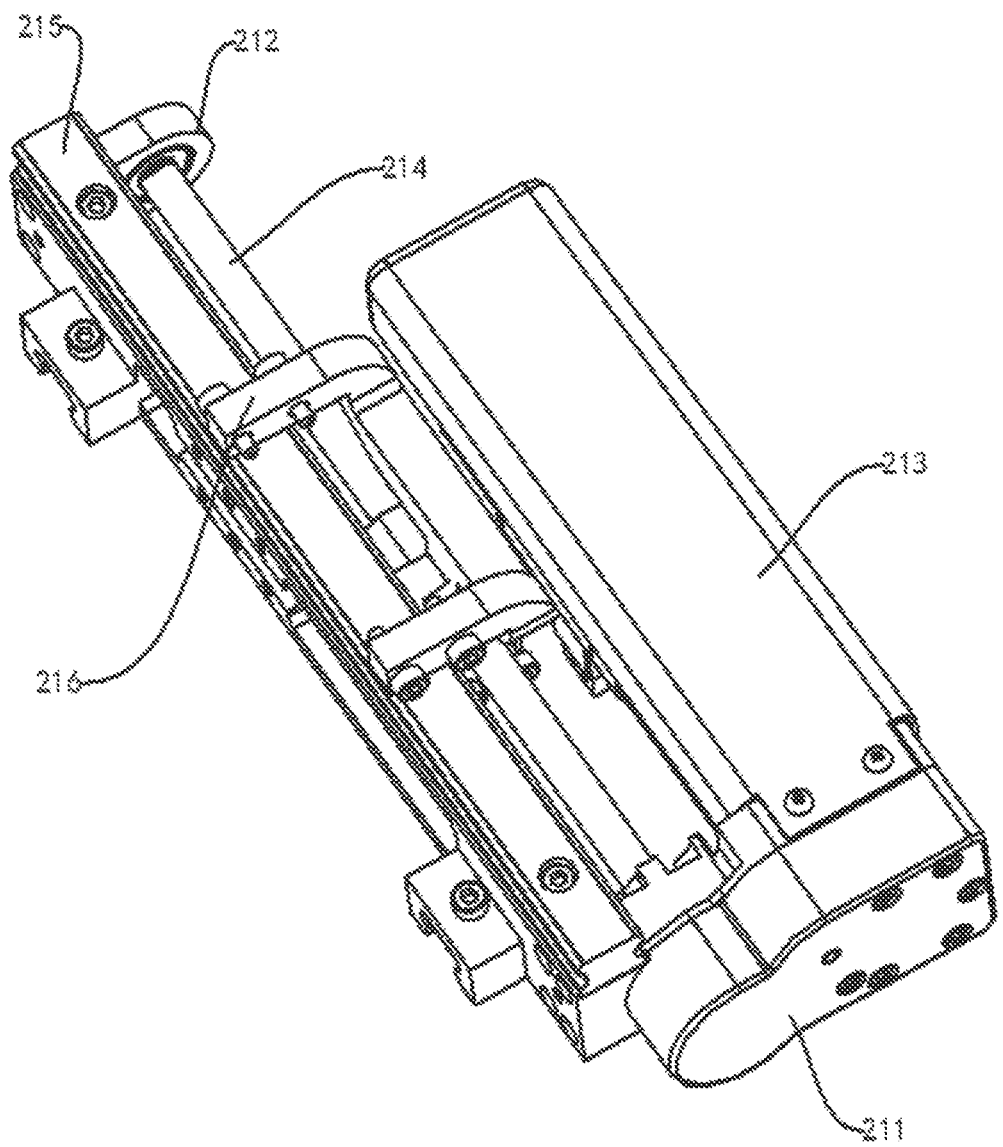
FIG. 2 is a schematic view of a first linear driving device of an obstacle navigation travelling device of a power line inspection robot according to the present invention.

Specifically, with reference to FIG. 2, the first linear driving device and the second linear driving device each includes a device base 211, two screw seats 212, a motion motor 213, a motion screw 214, a motion guiderail 215, and a motion platform 216. The screw seats are positioned on two ends of the device base respectively. The two ends of the motion screw are arranged respectively in the screw seats. The motion motor is secured to the device base. The motion motor drives the motion screw, and the motion screw drives the motion platform to slide on the motion guiderail.

Since the first linear driving device and second linear driving device here are known from prior art, detailed description thereof will not be made herein.

It is understood that the first linear driving device and second linear driving device may be configured as various forms, and no limitation is made in this respect in the present application. The two linear driving devices may be similar or different.

It is understood that the third driving device 500 may be configured as various forms. Since it is known from prior art, detailed description and limitation of the specific form thereof will not be made in the present application, as long as it can drive the third arm assembly to move linearly and two-dimensionally on the travelling device underframe.

Figure 3:
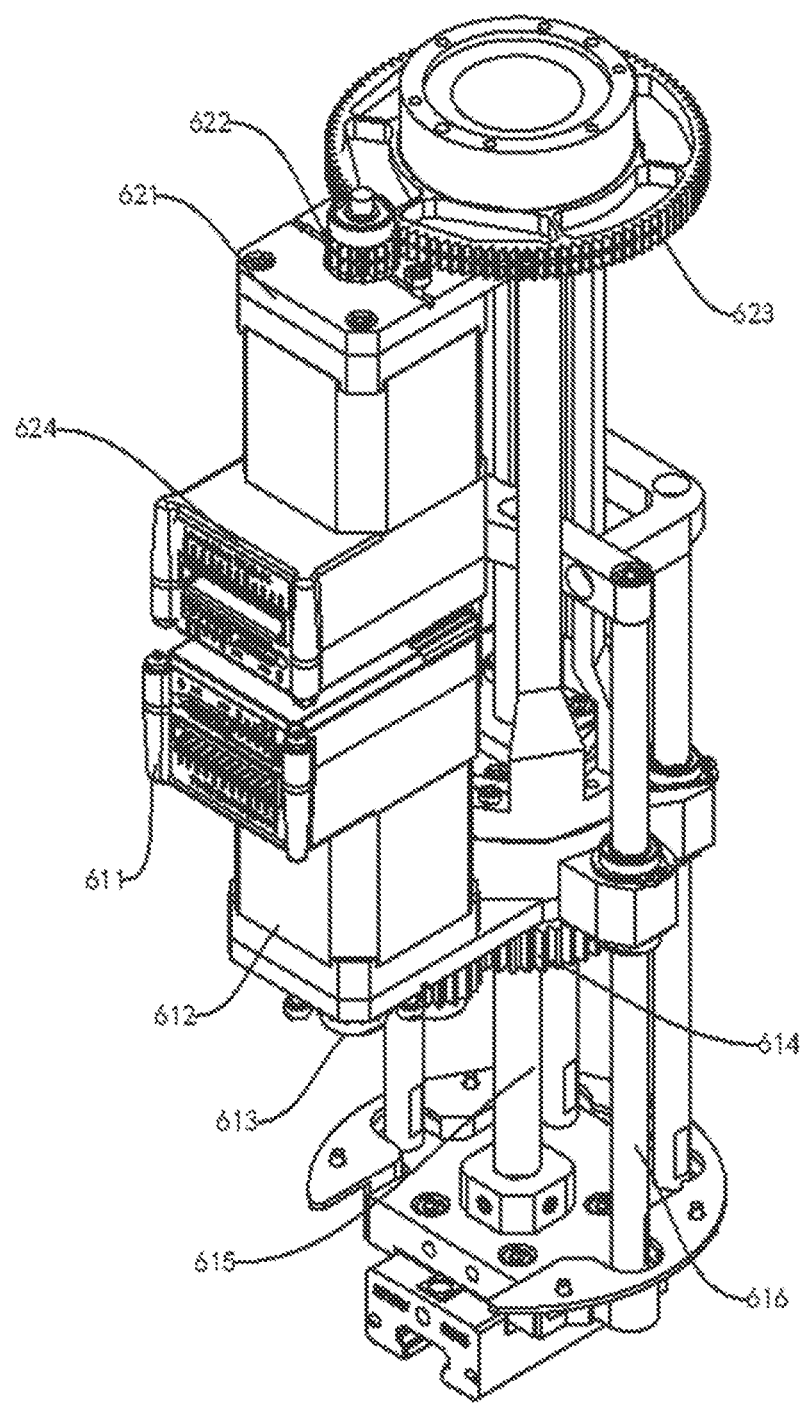
FIG. 3 is a schematic view of an elevating device and a rotating device of an obstacle navigation travelling device of a power line inspection robot according to the present invention.

With reference to FIG. 3, in an embodiment, the elevating device includes an elevating device support frame 611, an elevation motor 612, an elevation driving gear 613, an elevation driven gear 614, an elevation screw 615, and an elevation guiderail 616. The elevating device support frame is sleeved on the elevation guiderail. The elevation motor is secured to the elevating device support frame. The elevation motor drives the driving gear. The driving gear is engaged with the driven gear. The driven gear is sleeved on the elevation screw and in threaded connection with the elevation screw. The elevation guiderail includes four cylindrical support bars.

Since the elevating device here is known from prior art, detailed description will not be made thereof.

It is understood that the elevating device may be configured as various forms, and no limitation is made in this respect in the present application.

With reference to FIG. 3, in an embodiment, the rotating device includes a rotation motor 621, a rotation driving gear 622, a rotation driven gear 623, and a rotating device support frame 624. The rotation motor drives the driving gear. The rotation driving gear is engaged with the rotation driven gear. The driven gear is rotated on the rotating device support frame.

Since the rotating device here is known from prior art, detailed description will not be made thereof.

It is understood that the rotating device may be configured as various forms, and no limitation is made in this respect in the present application.

Figure 4:
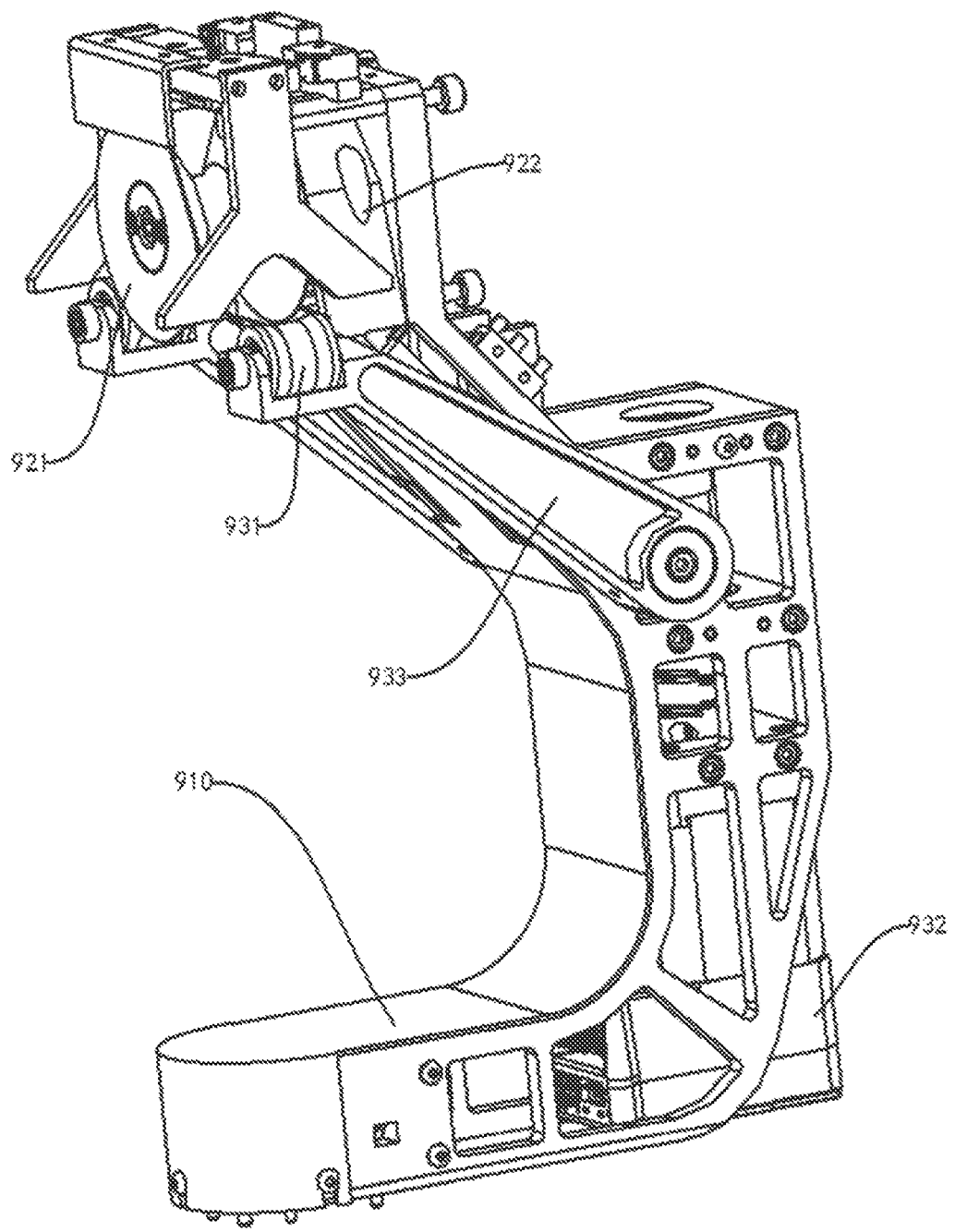
FIG. 4 is a schematic view of an arm of an obstacle navigation travelling device of a power line inspection robot according to the present invention.

With reference to FIG. 4, in an embodiment, the arm includes: an arm body 910; a travelling wheel assembly arranged on one end of the arm body, and including a travelling wheel 921 and a travelling wheel motor 922 for driving the travelling wheel; and a clamped wheel assembly arranged on one end of the arm body proximate to the travelling wheel assembly, and including two clamped wheels 931 and a clamped wheel motor 932 for driving the two clamped wheels. The two clamped wheels are positioned respectively on two side of the travelling wheel. The two clamped wheels and the travelling wheel are positioned respectively on two sides of the power line when the two clamped wheels and the travelling wheel are in contact with the power line.

The present invention has the beneficial effects of large friction against the power line and superior climbing ability. Specifically, since two clamped wheels are provided and they are positioned respectively on two sides of the travelling wheel, and the two clamped wheels and the travelling wheel are positioned respectively on two sides of the power line when they are in contact with the power line, three-point contact is produced and a triangle is formed, thereby significantly increasing the friction against the power line and providing superior climbing ability. (In contrast, the arm of the robot disclosed in the patents CN103904583A, titled SWING-ARM MOBILE INSPECTION ROBOT FOR RAILWAY TRACTION POWER LINES, CN106655006A, titled OBSTACLE NAVIGATION TRAVELLING DEVICE OF POWER LINE INSPECTION ROBOT, and CN106786170A, tilted POWER LINE INSPECTION ROBOT etc. adopts a configuration where the travelling wheel and the clamped wheel are arranged above one another. Since the travelling wheel and the clamped wheel are simply in single-point contact with the ground, the arm has little friction against the power line, which causes poor travelling ability, tendency to be disengaged, and poor climbing ability of the robot.)

In an embodiment, the two clamped wheels are driven by one clamped wheel motor at the same time. Specifically, the clamped wheel assembly includes a clamped wheel support frame, a clamped wheel motor, a worm shaft, a worm wheel, a clamped arm 933, a rotation shaft, and two clamped wheels. The clamped wheel motor is secured to the clamped wheel support frame. The clamped wheel motor drives the worm shaft. The end of the worm shaft far from the clamped wheel motor is positioned on the clamped wheel support frame. The worm shaft drives the worm wheel. The rotation shaft is arranged on the clamped wheel support frame. One end of the clamped arm is connected to the worm wheel via the rotation shaft, and the clamped wheel is arranged on the other end of the clamped arm.

As this arrangement is known from prior art, detailed description thereof is not made herein. It is understood that other arrangements may be used to enable the two clamped wheels to be driven by one clamped wheel motor at the same time, and no limitation is made in this respect in the present application.

In an embodiment, the two clamped wheels are each driven by a clamped wheel motor.

In an embodiment, the two clamped wheels are symmetric with respect to the travelling wheel.

In an embodiment, the two clamped wheels are asymmetric with respect to the travelling wheel.

In an embodiment, the diameter of the travelling wheel is greater than that of the clamped wheels.

It is understood that the specific form of the sensor is not limited in the present application, as long as that the sensor can serve to detect the obstacle encountered by the obstacle navigation travelling device of a power line inspection robot during travelling.

Specifically, the sensor is arranged on at least one side of the travelling wheel. Specifically, the sensor can be arranged on one side or both sides of the travelling wheel.

Specifically, the sensor is a photosensor or a touch sensor.

The above-mentioned embodiments are only preferred embodiments for fully illustrating the present invention and the protection scope of the present invention is not limited thereto. Equivalent substitutions or changes made by those skilled in the art on the basis of the present invention fall within the protection scope of the present invention. The protection scope of the present invention is defined by the claims.

What is claimed is:

1. An obstacle navigation travelling device of a power line inspection robot, comprising:
   a travelling device underframe;
   a first arm assembly mounted on a first end of the travelling device underframe;
   a first linear driving device for driving the first arm assembly to move linearly on the first end of the travelling device underframe;
   a second arm assembly mounted on a second end of the travelling device underframe;
   a second linear driving device for driving the second arm assembly to move linearly on the second end of the travelling device underframe;
   a third arm assembly mounted on the travelling device underframe and positioned between the first arm assembly and the second arm assembly;
   a third driving device for driving the third arm assembly to move linearly and two-dimensionally on the travelling device underframe; and
   a sensor for detecting whether the obstacle navigation travelling device of the power line inspection robot encounters an obstacle during travelling;
   wherein the first arm assembly, second arm assembly, and third arm assembly each comprises an elevating device at the bottom, a rotating device driven by the elevating device, and an arm driven by the rotating device, the rotating device is located in a plane during rotation that is parallel to an upper end face of the travelling device underframe, and
   wherein the first linear driving device and the second linear driving device each comprises a device base, two screw seats, a motion motor, a motion screw, a motion guiderail and a motion platform; the screw seats are positioned on two ends of the device base respectively, the two ends of the motion screw are arranged inside the screw seats respectively, the motion motor is secured to the device base for driving the motion screw, and the motion platform is driven by the motion screw to slide on the motion guiderail.

2. The obstacle navigation travelling device of a power line inspection robot of claim 1, wherein the elevating device comprises an elevating device support frame, an elevation motor, an elevation driving gear, an elevation driven gear, an elevation screw, and an elevation guiderail; the elevating device support frame is sleeved on the elevation guiderail, the elevation motor is secured to the elevating device support frame for driving the driving gear, the driving gear is engaged with the driven gear, the driven gear is sleeved on the elevation screw and in threaded connection with the elevation screw, and the elevation guiderail includes four cylindrical support bars.

3. The obstacle navigation travelling device of a power line inspection robot of claim 1, wherein the rotating device comprises a rotation motor, a rotation driving gear, a rotation driven gear, and a rotating device support frame, the rotation motor drives the driving gear, and the rotation driving gear is engaged with the rotation driven gear, and the driven gear is rotated on the rotating device support frame.

4. The obstacle navigation travelling device of a power line inspection robot of claim 1, wherein the arm comprises:
   an arm body;
   a travelling wheel assembly arranged on one end of the arm body, and including a travelling wheel and a travelling wheel motor for driving the travelling wheel; and
   a clamped wheel assembly arranged on one end of the arm body proximate to the travelling wheel assembly, and including two clamped wheels and a clamped wheel motor for driving the two clamped wheels, the two clamped wheels being positioned respectively on two sides of the travelling wheel, the two clamped wheels and the travelling wheel being positioned respectively on two sides of the power line when the two clamped wheels and the travelling wheel are in contact with the power line.

5. The obstacle navigation travelling device of a power line inspection robot of claim 4, wherein the two clamped wheels are each driven by a clamped wheel motor.

6. The obstacle navigation travelling device of a power line inspection robot of claim 4, wherein the two clamped wheels are symmetric with respect to the travelling wheel.

7. The obstacle navigation travelling device of a power line inspection robot of claim 4, wherein the diameter of the travelling wheel is greater than that of the clamped wheels.

8. The obstacle navigation travelling device of a power line inspection robot of claim 4, wherein the sensor is arranged on at least one side of the travelling wheel.

9. The obstacle navigation travelling device of a power line inspection robot of claim 1, wherein the sensor is a photosensor or a touch sensor.

\* \* \* \* \*